US012643661B2

(12) United States Patent
Armentia et al.

(10) Patent No.: US 12,643,661 B2
(45) Date of Patent: Jun. 2, 2026

(54) TELESCOPIC HALF CART RETAINER FOR RETAINING AIRCRAFT GALLEY CONTAINER TROLLEY

(71) Applicant: B/E Aerospace, Inc., Winston Salem, NC (US)

(72) Inventors: Leomar Mortel Armentia, Calamba (PH); Joseph Deo Macatangay Ayano, Batangas City (PH); Renier Joseph Villaflor Dela Rosa, Taytay (PH); Raffy Jay Dela Cruz Dayag, Muntinlupa City (PH); Keith Ivan Panopio Manalo, Mabini (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 19/179,362

(22) Filed: Apr. 15, 2025

(65) Prior Publication Data

US 2025/0353594 A1     Nov. 20, 2025

(30) Foreign Application Priority Data

Apr. 23, 2024  (EP) .................................... 24171930
May 10, 2024  (EP) .................................... 24175229

(51) Int. Cl.
  *B64D 11/04*     (2006.01)
  *A47B 31/00*     (2006.01)
  *A47B 31/06*     (2006.01)

(52) U.S. Cl.
  CPC .............. *B64D 11/04* (2013.01); *A47B 31/06* (2013.01); *A47B 2031/002* (2013.01)

(58) Field of Classification Search
  CPC .... B64D 11/04; B64D 11/0007; B64D 9/003; A47B 31/06; A47B 2031/002;
  (Continued)

(56) References Cited

U.S. PATENT DOCUMENTS 9,821,911 B2    11/2017  Wallbott et al.
10,995,529 B2    5/2021  Hogg et al.
(Continued)

OTHER PUBLICATIONS

European Patent Office, European Search Report dated Sep. 18, 2024 in Application No. 24171930.1.
(Continued)

*Primary Examiner* — Arfan Y. Sinaki
(74) *Attorney, Agent, or Firm* — SNELL & WILMER L.L.P.

(57)          ABSTRACT

A retainer for retaining an aircraft galley container trolley in an aircraft galley compartment is described herein. The aircraft galley compartment has a hollow interior and is configured to receive the aircraft galley container trolley in the hollow interior. The retainer comprises a first section configured to be attached to an interior surface of the hollow interior of the aircraft galley compartment, and a second section comprising an elongated shaft extending between from a first end at the first section and a second end. The second section comprises a rotatable knob at the second end of the elongated shaft. The first section comprises a rotatable turn handle connected to the first end of the elongated shaft. The elongated shaft has a central axis and the rotatable turn handle is configured to rotate about the central axis due to rotation of the rotatable knob.

16 Claims, 8 Drawing Sheets

(58) Field of Classification Search
CPC . Y10T 70/8838; B63B 29/22; B62B 2202/67;
E05B 63/0056; E05B 63/06
USPC ...................................... 70/61; 292/DIG. 60
See application file for complete search history.

(56) References Cited

U.S. PATENT DOCUMENTS

| | | | |
|---|---|---|---|
| 11,235,878 B2 * | 2/2022 | Hausner | B64D 9/003 |
| 11,584,528 B2 * | 2/2023 | Keskin | E05C 3/04 |
| 12,128,941 B2 * | 10/2024 | Lange | B62B 3/1404 |
| 12,365,464 B2 * | 7/2025 | Bollin | B64D 11/0007 |
| 2014/0197645 A1 * | 7/2014 | Lu | E05C 1/163 |
| | | | 16/412 |
| 2017/0166310 A1 * | 6/2017 | Wallbott | B25J 1/04 |
| 2017/0175421 A1 * | 6/2017 | Kang | E05C 1/12 |
| 2018/0016011 A1 | 1/2018 | Burd et al. | |
| 2019/0023070 A1 * | 1/2019 | Ursescu | B60B 33/0005 |
| 2021/0047042 A1 | 2/2021 | Tracey et al. | |
| 2021/0122471 A1 | 4/2021 | Vlaming et al. | |
| 2022/0127001 A1 * | 4/2022 | Chylinski | B64D 11/04 |
| 2025/0162715 A1 * | 5/2025 | Cunanan | B64D 11/04 |
| 2025/0162790 A1 * | 5/2025 | Kalitvencevs | B64D 11/0007 |
| 2025/0236392 A1 * | 7/2025 | Catapang | B64D 11/04 |

OTHER PUBLICATIONS

European Patent Office, European Search Report dated Oct. 7, 2024 in Application No. 24175229.4.

* cited by examiner

TELESCOPIC HALF CART RETAINER FOR RETAINING AIRCRAFT GALLEY CONTAINER TROLLEY

CROSS-REFERENCE TO RELATED APPLICATIONS

This application claims priority to EP Patent Application No. 24171930.1, filed Apr. 23, 2024 and titled "TELE-SCOPIC HALF CART RETAINER," and EP Patent Application No. 24175229.4, filed May 10, 2024 and titled "TELESCOPIC HALF CART RETAINER" which are incorporated by reference herein in their entirety for all purposes.

FIELD

The examples described herein relate to cart retainers for an aircraft.

BACKGROUND

In an aircraft, trolley containers are used to allow the airline crew to store and distribute food and drink etc. to the passengers safely and efficiently. Storage capacity on an aircraft is usually quite limited and so drinks and food must be stored in these space-saving containers. These trolley containers are often referred to in the industry as half carts. Safeguarding arrangements must be put in place, however, for restricting the movability of such containers when they are not in use. Such safeguards may include providing a retaining mechanism to retain the trolley in position within a trolley compartment so that the trolley cannot move when not in use.

SUMMARY

A retainer for retaining an aircraft galley container trolley in an aircraft galley compartment, the aircraft galley compartment being hollow and having a hollow interior and configured to receive the aircraft galley container trolley in its hollow interior, the retainer comprising a first section configured to be attached to an interior surface of the aircraft galley compartment, and a second section comprising an elongated shaft extending between from a first end at the first section and a second end, and comprising a rotatable knob at the second end of the elongated shaft, and wherein the first section comprises a rotatable locking means, connected to the first end of the shaft and wherein the shaft has a central axis and the rotatable locking means is configured to rotate about the central axis due to rotation of the knob, thereby moving the locking means between a first, locked position, and a second, unlocked position, and wherein the rotatable locking means has a length that is configured to be increased/extended or decreased/retracted.

In some examples, in the first, locked position, the locking means does not contact the aircraft galley container, thereby allowing movement of the aircraft galley container out of the compartment.

In some examples, in the second, locked position, the locking means contacts the aircraft galley container and blocks movement of the aircraft galley container out of the compartment.

In some examples, the rotatable locking means comprises a turn handle.

In some examples, the retainer further comprises an extender component configured to be securable in position relative to the rotatable locking means, to thereby increase or decrease an overall length of the rotatable locking means.

In some examples, the extender component is hollow and is shaped and sized to receive the turn handle therein.

In some examples, the rotatable locking means comprises a slot having a length and further comprising means for securing the extender component at a variety of positions along the length, to thereby extend and/or retract the overall length of the rotatable locking means.

In some examples, the first section is attached to the compartment in use.

In some examples, the first section is attached to an inner surface of the compartment via screws.

DETAILED DESCRIPTION

In an aircraft, container trolleys are positioned in an aircraft galley compartment when not in use. Two half carts 200, 300 may be positioned in the compartment such that a first half cart 200 is closest to the user and blocks access to the second half cart 300, which is positioned deeper within the compartment.

Figure 6:
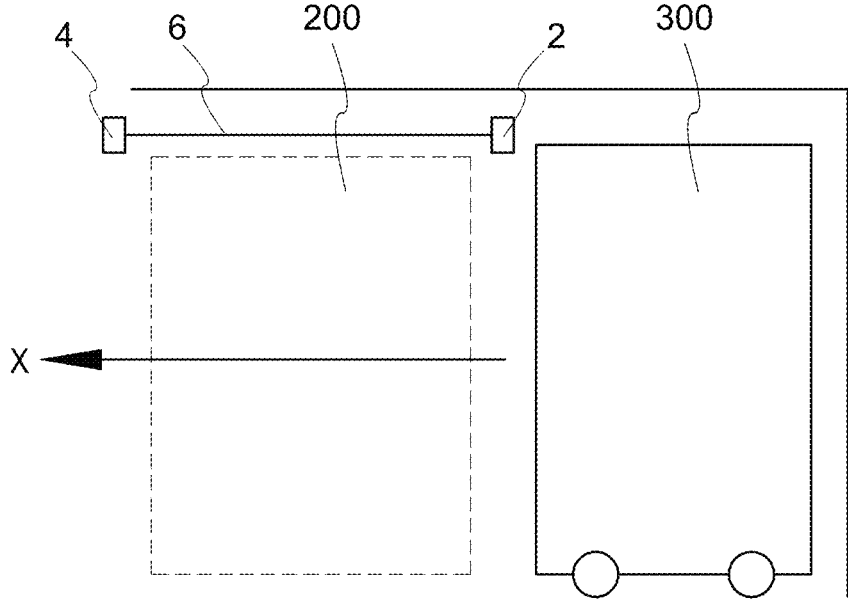
FIG. 6 shows the relative positions two half cart containers inside a compartment.
Figure 7A:
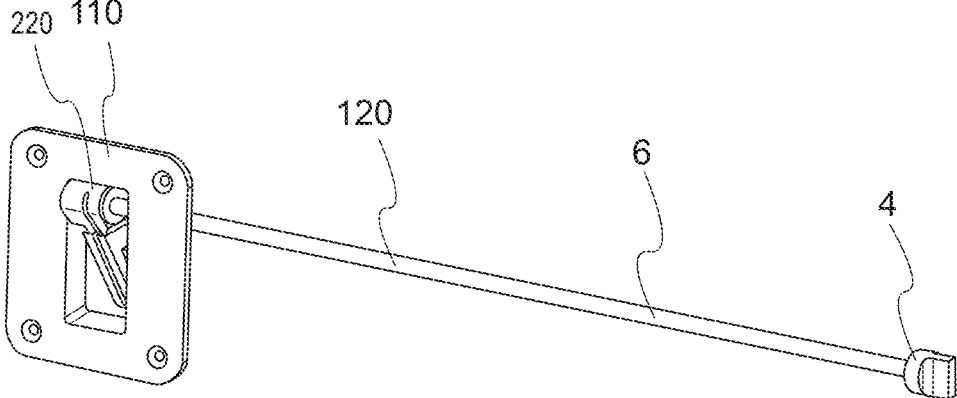
FIGS. 7A and 7B show a galley cart retainer, in accordance with various embodiments.
Figure 7B:
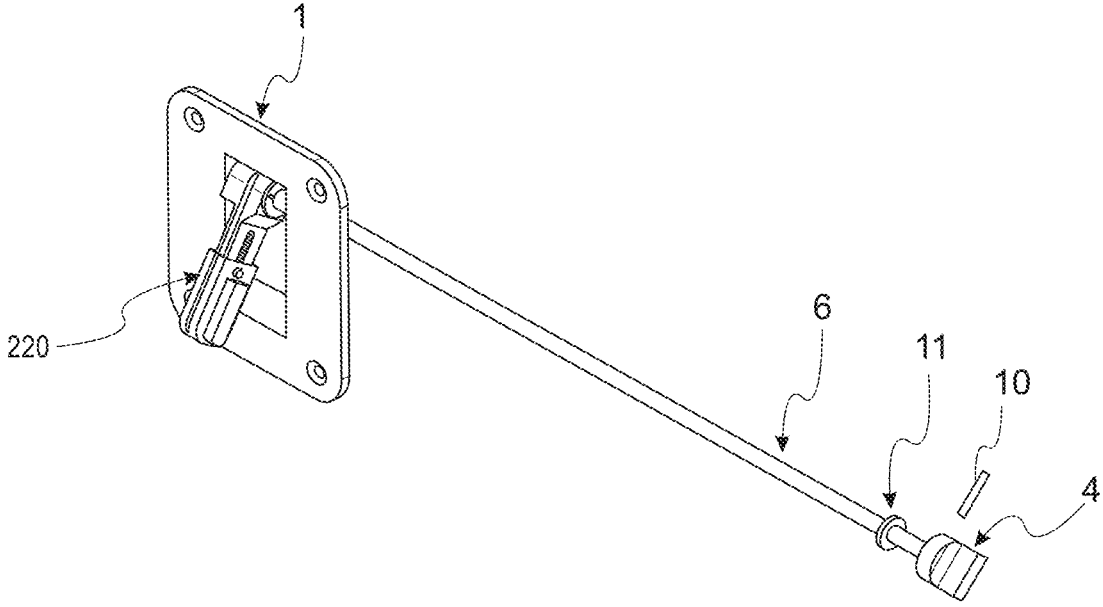

A half cart retainer may be used in combination with such half cart containers, the retainer having the purpose of preventing the second half size cart trolley (i.e. the one closest to the back of the compartment) from being pulled out of the trolley compartment in the direction X, in the event that the first half cart trolley 200 is out of the trolley compartment or is being used. The half cart retainer therefore holds the second half cart container trolley 300 in place by blocking the second half cart's 300 way out of the compartment. This is done by deploying a turn handle 2 and letting the second half cart trolley 300 make contact with it. This is shown in FIG. 6. The box drawn with broken lines denotes the location of the first half cart when inside the compartment. In FIG. 6, the first half cart is out of the compartment.

The half cart retainer is therefore used only when the first half cart is out of the compartment. This means that the half cart retainer is generally not in use when both containers/ trolleys are positioned in the compartment. The use of the half cart retainers when both trolleys are in the compartment is a rare occurrence.

Figure 1:
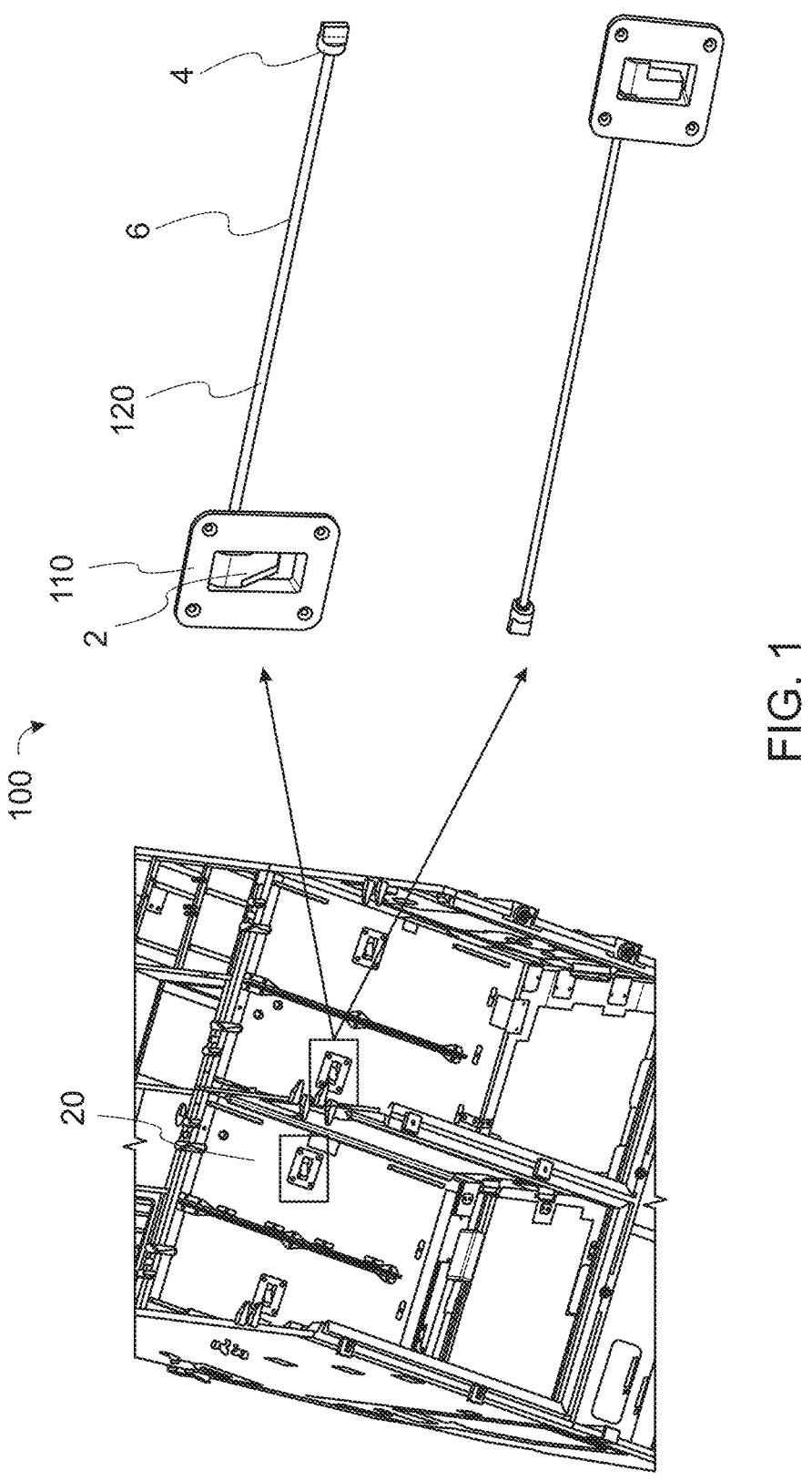
FIG. 1 shows a known type of galley cart retainer.
Figure 2:
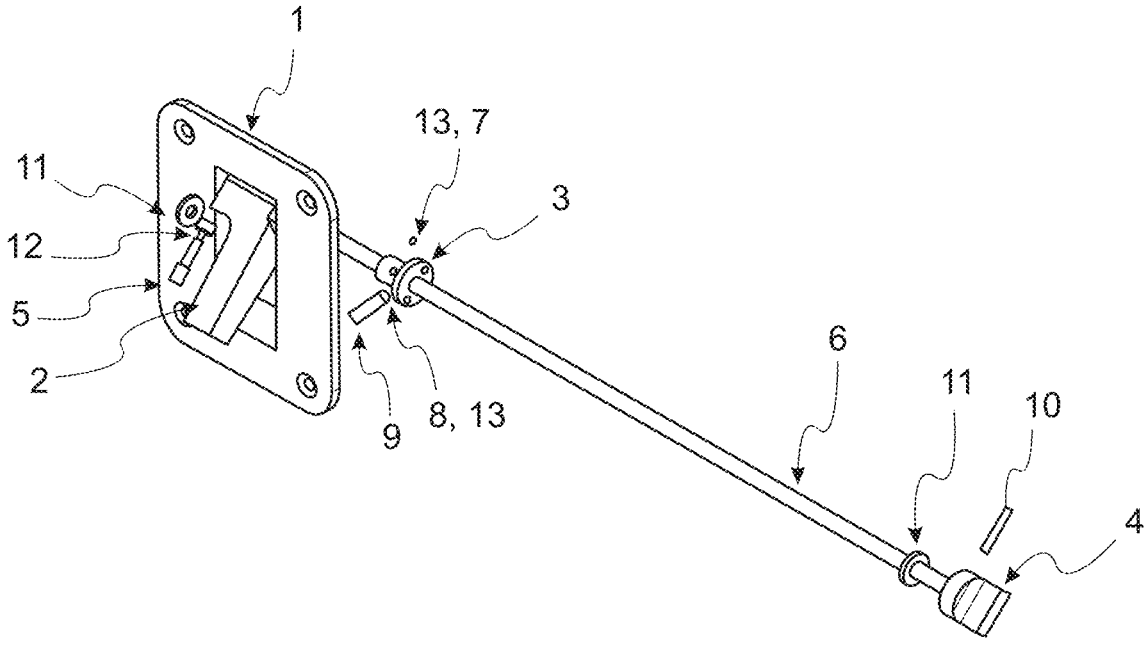
FIG. 2 shows more detail of the known type of galley cart retainer depicted in FIG. 1.

An example of a known type of galley half cart retainer is shown in FIGS. 1, 2, 3A and 3B. As can be seen in FIGS. 1 and 2, a retainer 100 is provided which is attached to an inner surface of the galley compartment 20. In other words, the galley compartment 20 is provided, comprising the retainer 100. The retainer 100 comprises a first section 110 that is fixedly attached to the compartment 20 in use. The retainer 100 may be attached via screws or other attachment means which are provided at the first section 110.

The retainer 100 also comprises a second section 120 which comprises an elongated shaft 6 extending away from the first section 110. At the longitudinal end of the shaft 6 that is furthest away from the first section 110, a rotatable means is provided. Such rotation means may comprise a rotation knob 4. The first section 110 also comprises a rotatable locking means, such as a turn handle 2, that is connected to the shaft 4 at its first end, i.e. the end furthest away from the rotation knob 4. When the trolley(s) are positioned within the galley compartment 20, the rotatable knob 4 is positioned such that it can be accessed by the aircraft crew. That is, the knob 4 is provided on an outer surface of the galley compartment 20 in use. Rotation of the knob 4 results in rotation of the turn handle 2. Upon rotation, the turn handle 2 is configured to be rotate downwards such that it blocks the second half cart container 300 from moving out of the compartment. In this way, the second half cart 300 that is positioned at the back of the compartment, can be locked/unlocked, via the retainer 100, in position within the compartment. This prevents the galley half cart 300 from moving when not in use and when the first half cart container 200 is removed, and secures it in place.

In such known systems, the retainer 100 can only be used to accommodate a limited trolley height or a standard trolley height, i.e. a trolley that fits within that specific sized and shaped trolley container 200, 300 such that the turn handle 2 is positioned so as to be able to block movement of the second half cart retainer. At present, with known systems and retainers for galley containers, only standard, Supplier Furnished Equipment (SFE) trolleys and various Buyer Furnished Equipment (BFEs) trolleys can be accommodated and whenever a new BFE trolleys is introduced that cannot be accommodated by standard half cart retainers, the immediate design solution is to add and create new "fit and form" on half cart retainers.

A more detailed example of the known type of galley cart retainer of FIG. 1 is shown in FIG. 2 and described below. The same features as are shown in FIG. 1 with reference to the known retainer of FIG. 1 are used here also. As can be seen, a retainer 100 is provided which is attached to an inner surface of the galley compartment 20. The retainer 100 comprises a first section 110 that is attached to the compartment 20 in use. The retainer 100 may be attached via screws or other attachment means which are provided at the first section 110. The retainer 100 also comprises a second section 120 which comprises the elongated shaft 6. At the longitudinal end of the shaft 6 a rotatable knob 4 is provided. The first section 110 also comprises a rotatable locking means, such as a turn handle 2, that is connected to the shaft 6. Rotation of the knob 4 results in rotation of the turn handle 2, such that the retainer 100 block or unblock movement of the second half cart container 300 when the first half cart container 200 is moved out of the compartment.

The first section 110 comprises a housing 1 that in use is connected to the interior surface of the galley compartment 20. The turn handle 2 is provided in the housing 1 as shown in FIG. 2. A helical locking insert 12 may be provided also in the housing 1. A cam 3 may be provided which is connected to the shaft 6 in use. A grease may also be provided. This is a lubricant that may be used to reduce friction and wear. First and second ball bearings 7, 8, as well as a compress spring 9 may also be provided in conjunction with the cam 3. A set screw 5 may also be provided in the housing 1. The set screw 5 may be configured to lock the turn handle 2 on the shaft. A roll pin 10 may be used in combination with the knob 4 at the end of the shaft 6. A washer 11 may also be used in combination with the knob 4.

Figures 3A, 3B:
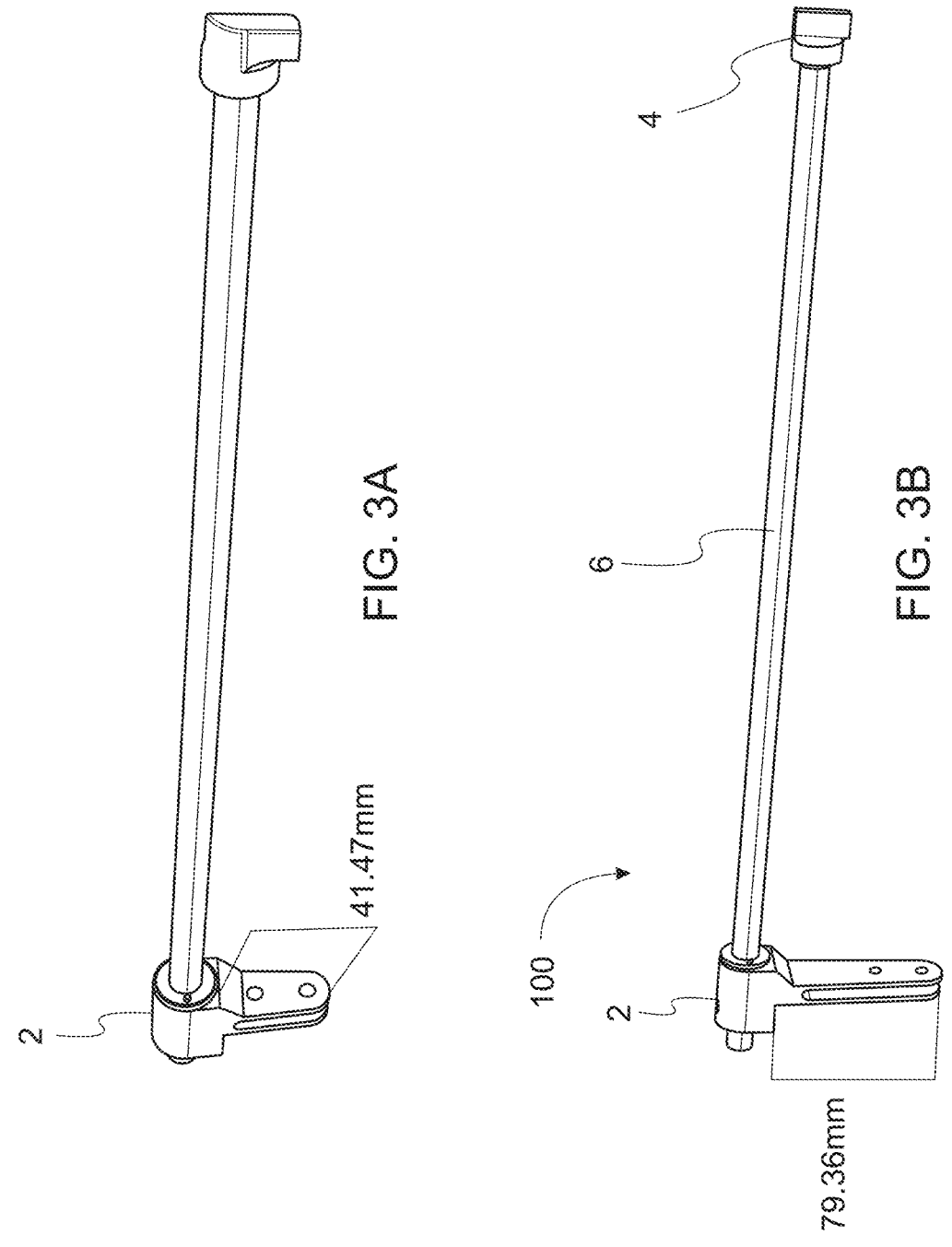
FIGS. 3A and 3B show a known type of galley cart retainer.

FIG. 3a also shows a first example of the known type of cart retainer as described with reference to that shown in FIGS. 1 and 2. This is known in the art as a catalogue retainer. A further example of a known type of cart retainer as described with reference to FIGS. 1 and 2 is also shown in FIG. 3b. This type of retainer is known in the art as a custom driven retainer.

An example of a new type of cart retainer is shown in FIGS. 4, 5, 6, 7A, and 7B. In this example, however, the turn handle 220 is telescopic/extendible/retractable. In the examples described herein, the turn handle 220 is telescopic/ extendible/retractable due to the presence of an extender component 230 which can be positioned at a plurality of lengths along the length of the turn handle 220, thereby lengthening or shortening the overall length of the turn handle 220.

Due to this, the length of the turn handle 220 can be modified so that the trolley compartment 20 can be used interchangeably within trolleys of different heights/widths and sizes. In an aircraft, it would be advantageous to provide interchangeable trolleys for distributing food and drink to passengers travelling within the aircraft. Such interchangeable trolleys would thereby allow different trolleys to be used in different as well as specific trolley bays within the aircraft. The examples described herein provide such an interchangeable trolley and trolley system. The examples thereby allow for existing trolley compartments/bays 20 to be used. This saves money for the airlines. The examples described herein with reference to the figures achieve this by providing a telescopic half cart retainer that is extensible and/or adjustable.

With the example of the new type of a galley half cart/trolley retainer shown in FIGS. 4, 5, 6, 7A, and 7B, where features are the same as for FIGS. 1, 2, 3a and 3b, these are described hereinafter using the same reference numerals. The elongated shaft 6 of these new retainers may be configured to support a trolley weighing up to 120 kg at a plurality of different trolley heights.

The new type of retainer comprises many of the same features as those shown with reference to FIGS. 1, 2, 3a and 3b, and functions in essentially the same way as described above, however, the new retainer has an extender component 230. This new design of retainer is therefore introduced to accommodate various trolley heights/widths and sizes.

Figure 4:
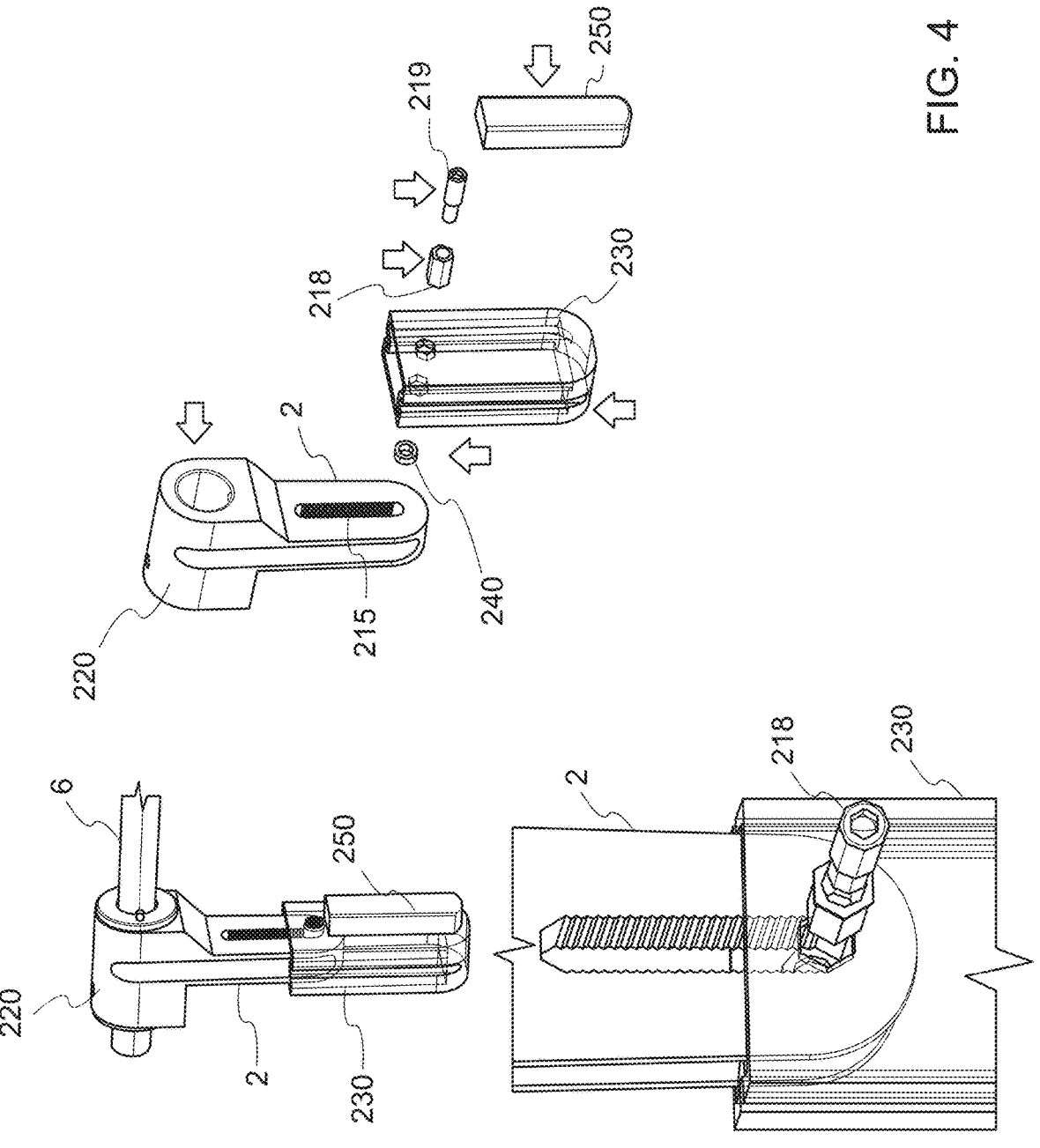
FIG. 4 shows the components of a new type of galley cart retainer as described herein.

FIG. 4 shows the turn handle 220 of the new type of galley cart retainer and how the components of the turn handle 220 of the new type of galley cart retainer are connected to each other in use. This new type of retainer 200 also comprises all of the same features as shown and described with reference to FIG. 2, with the exception that the turn handle 220 for locking is telescopic/adjustable/extendible, via the use of an extender component 230.

That is, the turn handle comprises a main body through which the shaft 6 extends in use. The turn handle 220 has a length that extends in an axis that lies in a direction perpendicular to longitudinal axis of the elongated shaft 6. The turn handle 220 works in conjunction with an extender component 230, to alter the overall length of the turn handle 220/extender component 230 as required. In some examples, the extender component 230 is removable from the turn handle 220 and may be hollow and shaped and sized so as to be configured to receive the section of the turn handle 220 that would normally be inserted between/removed from between the carts 200, 300 when in use, to thereby lock or unlock the cart to the trolley compartment. The turn handle 220 is also sized and shaped so as to be receivable within the hollow extender component 230. The turn handle 220 extends away from the shaft 6 in the direction of the trolley in use, such that the turn handle 220/extender component 230 can be rotated so as to block movement of the second half cart container 300 and lock it in place within the compartment. In some examples, in order to achieve locking of the extender section 230 at a predetermined position, and thereby fixing the overall length of the turn handle 220, the turn handle comprises a slot 215 which extends longitudinally along the length of the in the turn handle 220 in the direction of the trolley in use.

A threaded insert 240 may be provided in the slot 215 of the turn handle 220. The turn handle 220 may be connected to the extender component 230 by inserting the turn handle 220 into the extender component 230 and securing the extender component 230 in place a predetermined position along the length of the slot 215. The new type of retainer may use a bushing and nut, such as a brash brushing and nut with material strength that can hold the 120 kg trolley at $9g$ Forward load. This mechanism fastens the turn handle 220 and extender component 230 to hold the trolley in position in use. The brass bushing 218 and nut 219 may be inserted into a hole provided in the extender component 230 to lock the extender component 230 in place relative to the turn handle 220. The brass bushing and nut 219 may be aligned with a required position within the slot of the turn handle 220.

Figure 5:
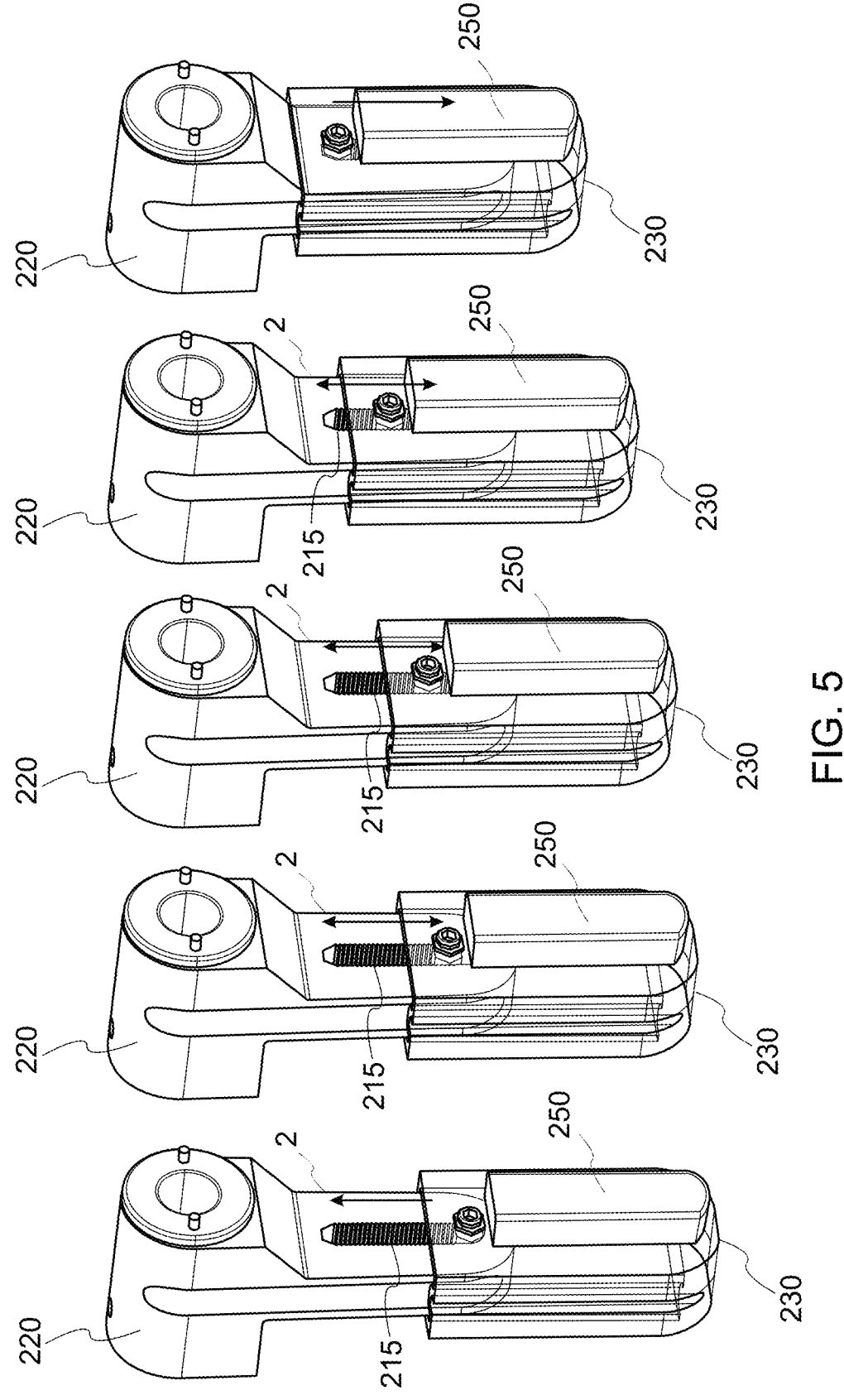
FIG. 5 shows a plurality of different positions of the new type of galley cart retainer as shown in FIG. 4.

Due to the length of the turn handle 220 being variable in this way, the overall length of the turn handle 220 may be increased or decreased, i.e. the turn handle 220 may be extended or retracted. This means that the length of the turn handle 220 is configured to block a plurality of trolleys of different heights, widths or sizes as required. As shown in FIG. 5, this can achieve by fixing the position of the extender component 230 to be positioned at a plurality of different positions and heights, depending on the location at which the nut 219 is inserted through the hole of the extender section 230 and the slot 215 of the turn handle 220. Other means of securing and positioning the location of the extender component 230 may also be used and the examples are not limited to the u se of a brash bushing and nut.

In some examples, a rub strip 250 may also be provided. The rub strip 250 is configured to absorb the impact that the trolley creates when it is being pushed inside the compartment. The new design may use the same materials as known half cart retainer (e.g. rubber, screw, metal materials etc.).

FIG. 5 shows how the retainer can be extended/retracted/adjusted depending on the location within the slot 215 wherein the extender component 230 is positioned. As can be seen, the locking means, i.e. the turn handle 220 of the new telescopic half cart retainer is extendible and adjustable. The extender component 230 may be considered to correspond to a lateral tube that can be moved outside of and relative to the main body of the housing that connects the galley container to the galley compartment 20. Using the nut 218 or a screw, or other attachment means, the turn handle 220 may be movable relative to the extender section 230, to thereby adjust the retainer's length to secure the trolley within the trolley compartment, regardless of its size and height. Movement of the turn handle 220 within the extender section 230 may be performed manually.

This new design is easy to install and use. Since this design allows for the accommodation of a varying trolley height, width or size, the retainer provides a one size fits all solution. The customer therefore has the liberty to change the trolley with respect to its height prior to the scheduled flight. This can save man-hours in designing a new retainer and trolley bay fit check since there is no longer a need to create new retainer. The Innovative design would also help on procurement strategic buying as this half cart retainer can be applicable to most if not all Galleys as it is a general solution on varying trolley height so we could stock on large quantities. The new design could also help avoid possible tooling cost (if would be needed on the new design) for a specific galley or HoV.

The new design can be retrofitted into many existing aircraft galleys with the possible application to different aircraft galleys. It can also be retrofitted without dismantling the galley.

The invention claimed is:

1. A retainer for retaining an aircraft galley container trolley in an aircraft galley compartment, the retainer comprising:
   a first section configured to be attached to an interior surface of the aircraft galley compartment and comprising:
   a rotatable turn handle, and
   an extender component shaped and sized to receive the turn handle therein and configured to slidably couple to the rotatable turn handle such that the first section has a length that is configured to be increased or decreased; and
   a second section comprising:
   an elongated shaft extending between a first end at the first section and a second end, the elongated shaft having a central axis, and
   a rotatable knob at the second end of the elongated shaft,
   wherein the rotatable turn handle is configured to be connected to the first end of the shaft, and
   wherein the rotatable turn handle is configured to rotate about the central axis due to rotation of the rotatable knob, thereby moving the rotatable turn handle between a first, locked position, and a second, unlocked position.

2. The retainer of claim 1, wherein, in the first, locked position, the rotatable turn handle is configured not to contact the aircraft galley container trolley.

3. The retainer of claim 1, wherein, in the second position, the rotatable turn handle is configured to contact the aircraft galley container trolley and is configured to block movement of the aircraft galley container trolley out of the aircraft galley compartment.

4. The retainer of claim 1, wherein the extender component is configured to be securable in position relative to the rotatable turn handle.

5. The retainer of claim 1, wherein the extender component is hollow.

6. The retainer of claim 1, wherein the rotatable turn handle comprises a slot having a length and further comprising means for securing the extender component at a variety of positions along the length of the slot, to thereby increase and/or decrease the overall length of the rotatable turn handle.

7. The retainer of claim 1, wherein the first section is configured to attach to the aircraft galley compartment in use.

8. The retainer of claim 1, wherein the first section is configured to attach to an inner surface of the aircraft galley compartment via screws.

9. A retainer for retaining an aircraft galley container trolley in an aircraft galley compartment, the retainer comprising:

a first section configured to be attached to an interior surface of the aircraft galley compartment and comprising:

a rotatable turn handle defining a slot with a slot length, and an extender component configured to slidably couple to the rotatable turn handle such that the first section has a length that is configured to be increased or decreased by securing the extender component at a variety of positions along the slot length; and a second section comprising:

an elongated shaft extending between a first end at the first section and a second end, the elongated shaft having a central axis, and a rotatable knob at the second end of the elongated shaft, wherein the rotatable turn handle is configured to be connected to the first end of the shaft, and wherein the rotatable turn handle is configured to rotate about the central axis due to rotation of the rotatable knob, thereby moving the rotatable turn handle between a first, locked position, and a second, unlocked position.

10. The retainer of claim 9, wherein, in the first, locked position, the rotatable turn handle is configured not to contact the aircraft galley container trolley.

11. The retainer of claim 9, wherein, in the second position, the rotatable turn handle is configured to contact the aircraft galley container trolley and is configured to block movement of the aircraft galley container trolley out of the aircraft galley compartment.

12. The retainer of claim 9, wherein the extender component is configured to be securable in position relative to the rotatable turn handle.

13. The retainer of claim 9, wherein the extender component is hollow and is shaped and sized to receive the turn handle therein.

14. The retainer of claim 9, wherein the rotatable turn handle comprises a slot having a length and further comprising means for securing the extender component at a variety of positions along the length of the slot, to thereby increase and/or decrease the overall length of the rotatable turn handle.

15. The retainer of claim 9, wherein the first section is configured to attach to the aircraft galley compartment in use.

16. The retainer of claim 9, wherein the first section is configured to attach to an inner surface of the aircraft galley compartment via screws.

* * * * *